J. J. PACKEWITZ & S. NUDELMAN.
LATHE TOOL.
APPLICATION FILED NOV. 17, 1913.
1,097,818.
Patented May 26, 1914.
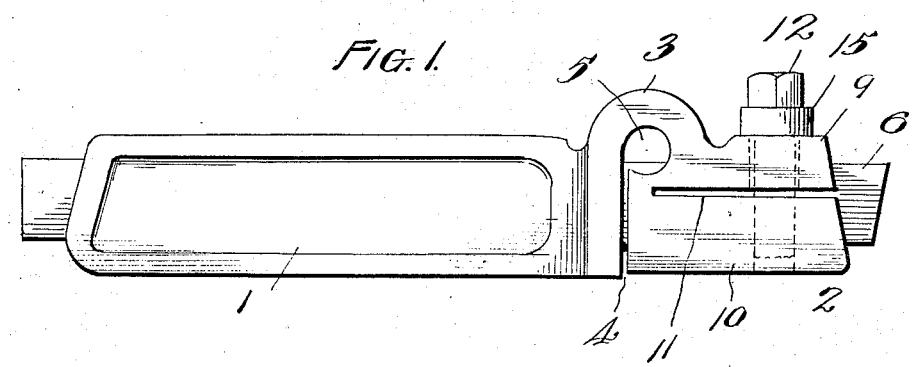
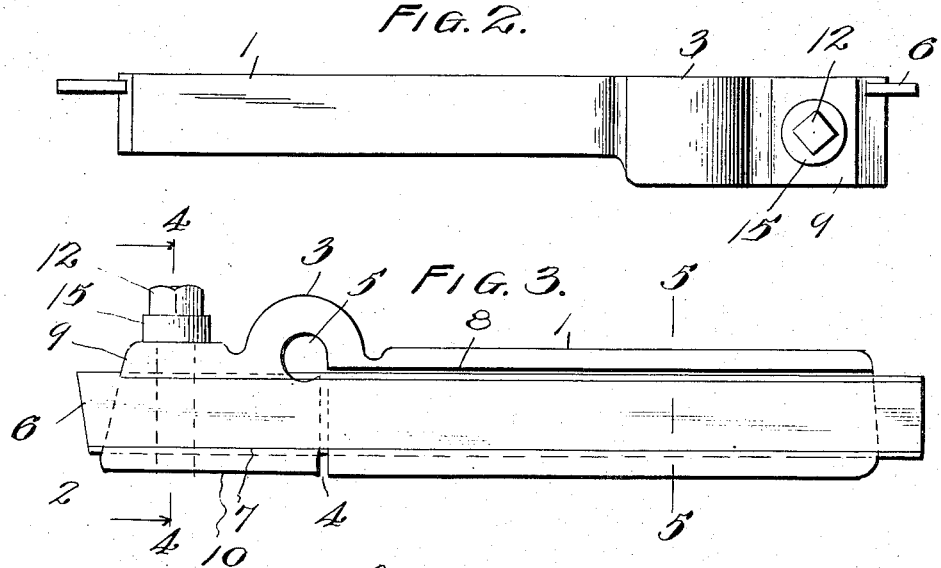
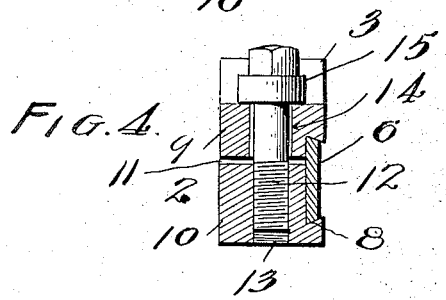
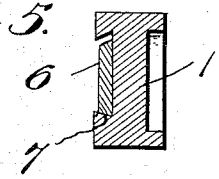
WITNESSES.
C. K. Davis
C. A. White
INVENTORS
JOSEPH J. PACKEWITZ
SOLOMON NUDELMAN
W. W. Wright
Attorney.

UNITED STATES PATENT OFFICE.

JOSEPH J. PACKEWITZ AND SOLOMON NUDELMAN, OF NEW YORK, N. Y.

LATHE-TOOL.

1,097,818.  Specification of Letters Patent.  Patented May 26, 1914.

Application filed November 17, 1913. Serial No. 801,529.

*To all whom it may concern:*

Be it known that we, JOSEPH J. PACKEWITZ and SOLOMON NUDELMAN, citizens of the United States, residing at New York, in the county of New York and State of New York, have invented certain new and useful Improvements in Lathe-Tools, of which the following is a specification.

Our invention relates to improvements in lathe tools and is designed particularly for the purpose of providing a simple and effective means for holding the tool proper or cutting member in the body of the tool. This means for holding the cutter provides a clamping device having a long frictional contact surface by means of which the cutter is held securely and rigidly in the holder, but it will be understood of course that the clamping portion of the holder in which the cutter is secured is yieldable with relation to the shank of the tool.

A further meritorious feature of the invention resides in the manner of holding the cutter in the shank of the tool and in the position the cutter occupies in the shank so that it may be observed by an attendant, as will be more fully described hereinafter.

The invention consists in certain novel combinations and arrangements of parts as set forth in the following specification and claims.

In the accompanying drawings we have illustrated one complete example of the physical embodiment of our invention constructed according to the best mode we have so far devised for the practical application of the principles of the invention.

Figure 1 is a side elevation of a tool embodying our invention. Fig. 2 is a top plan view of Fig. 1. Fig. 3 is a view of the tool showing the reverse side of Fig. 1. Fig. 4 is a transverse sectional view on line 4—4 of Fig. 3. Fig. 5 is a transverse sectional view on line 5—5 of Fig. 3.

In the preferred embodiment of our invention we employ the standard form of tool which involves the shank portion 1 of the tool, the clamping member or portion as the head 2, and the yielding connection or spring portion 3 which connects the clamping head with the shank, the usual slot 4 and opening 5 being supplied to give the necessary resiliency to the yielding arch 3. The body or shank 1 of the tool is to be clamped in the post of the lathe, or other portion of a machine in which it is to be used, and the cutter 6 is held in the body of the tool holder which is grooved along one of its faces for the purpose, as indicated at 7 in the shank and 8 in the clamping head of the holder.

The walls of each of the grooves are undercut and the edges of the cutter are beveled to form a dovetail connection with the walls of the grooves. The cutter or cutting blade, it will be seen in the drawings, is a comparatively long flat steel plate, of sufficient length to project from the rear of the tool holder, and the forward or cutting end of the blade has a long seat between the clamping members 9 and 10 of the clamping head. These members are separated by a kerf or slot 11 extending at right angles to the direction of the slot 4 and parallel with the cutter blade.

The cutter is rigidly held in its head by means of the clamp bolt 12 which is screwed into the threaded opening 13 of the member 10 and passed through an unthreaded opening 14 in the member 9, while a shoulder 15 on the bolt affords a bearing on the upper face of the member 9 so that the member 10 may be drawn upwardly toward the member 9 and rigidly incase and hold the cutter between the grooved portions of the members.

It will be understood that the blade is clamped between the two members 9 and 10 by turning the bolt 12 until the shoulder or flange 15 bears against the upper face of the member 9 and a continued movement of the bolt draws the member 10 toward the member 9 to clasp the cutter 6 therebetween. The broad flat cutter and the comparatively long clamping head, together provide for a rigid and secure clamping of the cutter between the grooved portions of the clamping head and the cutter is retained in the head agaist displacement of an accidental character.

It will be noted that the base line or bottom face of the member 10 is not in the same plane with the base line or bottom face of the shank 1, this manner of locating the parts being for the purpose of allowing for movement of the tool without contact with the tool post, so that the head of the holder may be flexed until the lower or base line of the member 10 is brought flush with the bottom face of the shank, the contact of the walls of the slot 4 limiting the movement of the head. This movement of the head may be detected by a corresponding movement of the rear end of the cutter or cutter blade which projects beyond the shank end, and it will be noted that the groove in the shank (8) is wide enough to permit this movement of the blade. Thus, while it is desirable that the tool shall yield slightly in the direction of rotation when the point encounters hard steel, it is also desirable that the attendant shall be aware of the movement, and his attention will be attracted by the movement of the rear end of the cutter blade.

Having thus fully described our invention, what we claim is:—

The combination with a shank having a groove in its face and a spring clamping head having a complementary groove of less width and the bottom face of said head being in a higher plane than the bottom face of the shank, of a cutter blade extended through both grooves, a slot in the head parallel with the trigger blade, and means for clamping said blade in the cutter head.

In testimony whereof we affix our signatures in presence of two witnesses.

JOSEPH J. PACKEWITZ.
SOLOMON NUDELMAN.

Witnesses:
  B. J. GOODLICH,
  PETER A. BREBUIS, Jr.